United States Patent [19]
Dearman

[11] Patent Number: 5,366,383
[45] Date of Patent: Nov. 22, 1994

[54] CONNECTOR ASSEMBLIES

[75] Inventor: Kenneth W. J. Dearman, Slough, England

[73] Assignee: Smiths Industries Public Limited Company, London, England

[21] Appl. No.: 118,716

[22] Filed: Sep. 10, 1993

[30] Foreign Application Priority Data

| Sep. 19, 1992 | [GB] | United Kingdom | 9219944 |
| Oct. 22, 1992 | [GB] | United Kingdom | 9222223 |
| Apr. 28, 1993 | [GB] | United Kingdom | 9308744 |
| Jun. 5, 1993 | [GB] | United Kingdom | 9311656 |

[51] Int. Cl.$^5$ .................................................. H01R 4/38
[52] U.S. Cl. .................................................. 439/321
[58] Field of Search ............... 439/307, 310, 312, 314, 439/320, 321

[56] References Cited

U.S. PATENT DOCUMENTS

| 3,124,404 | 3/1964 | Chesnov | 439/310 X |
| 3,546,658 | 12/1970 | Horssen et al. | 439/320 X |
| 3,725,845 | 4/1973 | Moulin | 439/320 X |
| 4,066,314 | 1/1978 | Williams | 439/320 X |
| 4,676,573 | 6/1987 | Norman | 439/321 X |
| 4,838,805 | 6/1989 | Sturges | 439/321 |
| 4,984,995 | 11/1991 | Tucker et al. | 439/321 |
| 5,108,297 | 4/1992 | Hoffman et al. | 439/134 |
| 5,192,219 | 3/1993 | Fowler et al. | 439/321 |

FOREIGN PATENT DOCUMENTS 2105923 3/1983 United Kingdom .
2127234 4/1984 United Kingdom .

Primary Examiner—Khiem Nguyen
Attorney, Agent, or Firm—Pollock, Vande Sande and Priddy

[57] ABSTRACT

A connector assembly has two rotatable parts both of which have external splines. An internally-splined locking ring is slidable along the assembly into a locking position where the splines on the ring engage the splines on both the rotatable parts so that relative rotation of the parts is prevented.

9 Claims, 5 Drawing Sheets

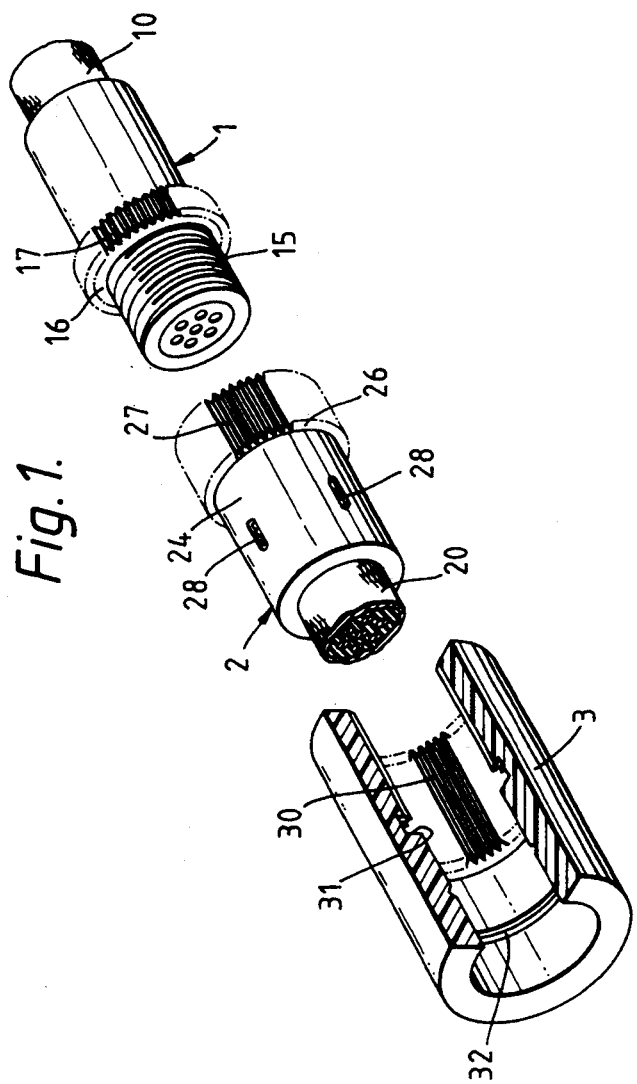
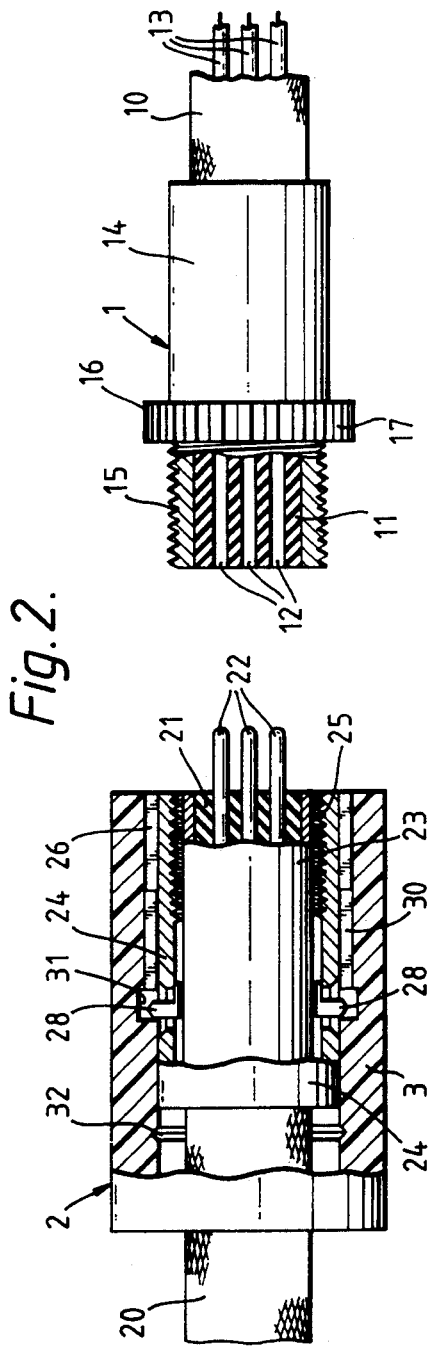
Fig. 1.
Fig. 2.

CONNECTOR ASSEMBLIES

BACKGROUND OF THE INVENTION

This invention relates to connector assemblies.

The invention is more particularly concerned with lockable connector assemblies.

Where a connector assembly is to be used in conditions where it may be subject to vibration or other forces tending to separate the two parts of the assembly, it is desirable for the assembly to have some form of means for locking the two parts together. One example of a connector assembly provided with means for resisting uncoupling is described in EP 0428353. This assembly has a locking nut that requires a greater force to uncouple than to couple.

SUMMARY OF THE INVENTION

It is an object of the present invention to provide an alternative form of connector assembly that will reduce the risk of separation of the two parts of the assembly. The term connector is used to cover any device connected on, or that serves to make connection to, a cable or the like.

According to the present invention there is provided a connector assembly including first and second components that are rotatable relative to one another, wherein each component has a surface formation, the assembly including a locking member having a surface formation that is shaped to cooperate with the surface formations on the components, the locking member being displaceable along the assembly between a first position in which the surface formation on the locking member is out of engagement with at least the surface formation on one of the components so as to allow relative rotation of the two components and a second position in which the surface formation on the locking member engages the surface formations on both the components so as to prevent relative rotation of the components and thereby lock the two components together.

The locking member is preferably a ring that embraces the first and second components in the second position. The surface formations may be splines. The assembly preferably includes resilient means for resisting displacement of the locking member along the assembly. The locking member may be of a plastics material. The assembly may include an elastomeric member in contact with the locking member that is adapted to absorb vibration of the locking member. The first and second components may have cooperating threads that serve to draw the components together. The first and second components may be electrical plug and socket components. Alternatively, the first and second components may be parts of an electrical connector, one of the components being a cable fitment.

Assemblies for electrical cables according to the present invention, will now be described, by way of example, with reference to the accompanying drawings.

BRIEF DESCRIPTION OF THE DRAWINGS

FIG. 1 is an exploded perspective view of the assembly;

FIG. 2 is a sectional side-elevation of the assembly;

DESCRIPTION OF THE PREFERRED EMBODIMENTS

Figure 3:
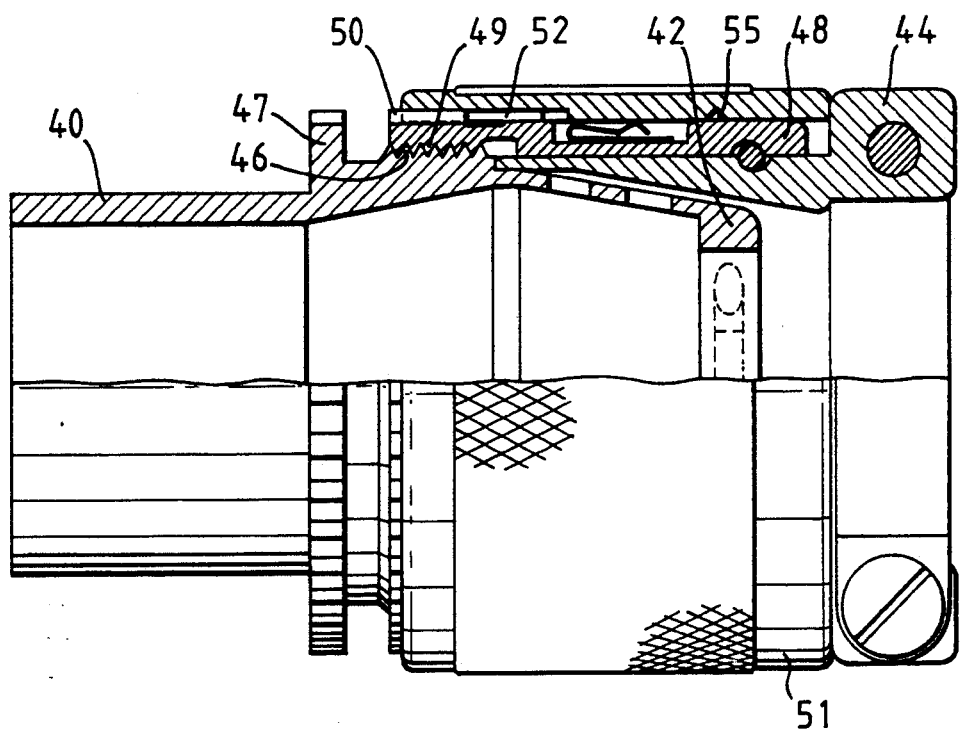
FIGS. 3 and 4 are sectional side elevations of an alternative assembly in an unlocked and locked position respectively.

With reference first to FIGS. 1 and 2, the assembly comprises a female socket component 1 and a male plug component 2 which can be mated with the socket component and locked together by means of a locking ring 3.

The female socket component 1 is mounted at the forward end of an electrical cable 10 and includes an internal, electrically-insulative body 11 which supports a number of electrical sockets 12. The sockets 12 are electrically connected to individual wires 13 extending within the cable 10. The insulative body 11 is fixedly mounted within an outer metal shell 14 of generally cylindrical shape. At its forward end, the shell 14 has an external screw thread 15 extending rearwardly to a flange 16 that projects around the external surface of the shell. The flange has splines 17 or similar surface formations around its periphery.

The male plug component 2 is mounted at the rear end of a cable 20 and includes an internal, electrically-insulative body 21 supporting a number of electrical plug elements 22 disposed in alignment with the sockets 12 in the socket component 1. The plug elements 22 are electrically connected to respective wires (not shown) extending along the cable 20. The insulative body 21 is fixedly supported in an internal metal sleeve 23 that in turn supports an outer metal shell 24, which is slidable along the internal sleeve 23. At its rear, right-hand end, the outer shell 24 has an internal screw thread 25 that is adapted to engage the screw thread 15 on the shell 14 of the socket component 1. A splined flange 26 projects around the external surface of the shell 24 at its right-hand end. The external diameter of the flange 26 and the shape of its splines 27 are the same as the splines 17 on the flange 16 of the socket component 1. Four spring catches 28 project from the shell 24 about midway along its length and are equally disposed around the circumference of the shell.

The locking ring 3 is preferably of a plastics material and is of generally cylindrical shape, being mounted on the shell 24 of the plug unit 2 so that it can be displaced along its length. A splined region 30 extends around the inside of the ring 3 at its right-hand end and this engages with the splined flange 26 on the outer shell 24 so that rotation of the ring 3 relative to the outer shell is prevented. The length of the splined region 30, on the inside of the locking ring, is about twice that of the flange 26 so that the ting can be slid rearwardly, to the tight. Two grooves 31 and 32 extend around the inside of the locking ring 3 and act to restrain longitudinal displacement of the ring when a grove is engaged by the spring catches 28. When the ring 3 is in the forwards position shown in FIG. 2, displaced to the left to its full extent, the spring catches 28 lie in the rear, right-hand groove 31; when the ring is displaced rearwardly to its full extent, the spring catches lie in the forward, left-hand groove 32.

In use, the locking ring 3 is pushed forwardly to its full extent, as shown in FIG. 2, and the two components 1 and 2 are pushed together so that the plugs 22 are inserted within, and thereby mate with, the sockets 12. The outer shell 24 on the plug component 2 is then rotated so that its screw thread 25 engages the screw thread 15 on the socket component 1. This is achieved by gripping and twisting the locking ring 3, which may be formed with a knurled outer surface to improve grip. When the screw threads 15 and 25 are fully engaged, the two components 1 and 2 are locked together by pushing the locking ring 3 rearwardly so that its splined region 30 slides over and engages the splines 17 on the flange 16 as well as the splines 27 on the flange 26. In its rear position, the spring catches 28 engage in the forward groove 32. It may be necessary to twist the outer shell 24 slightly in one direction or the other to align the splines on the two flanges 16 and 26 before the locking ring 3 can be pushed over the flange on the socket component 1. Engagement of the spring catches 28 in the rear groove 31 provides some initial resistance to displacement of the locking ting 3 but this is easily overcome using manual force It can be seen that, in its rear position, the locking ring 3 prevents the outer shell 24 rotating relative to the socket shell 14 and thereby prevents loosening of the two screw threads 25 and 15. The two components 1 and 2 will, therefore, be effectively locked together until the locking ring 3 is displaced forwardly. The shape of the forward groove 32 may be such that a greater force is required to displace the locking ring 3 forwardly, out of its locking position, than rearwardly into the locking position.

The invention is not confined to use on electrical connectors but could, for example, be used on fluid, optical, microwave or other connectors. The connectors need not be at the end of cables or the like but could be mounted on a bulkhead or equipment casing.

Figure 4:
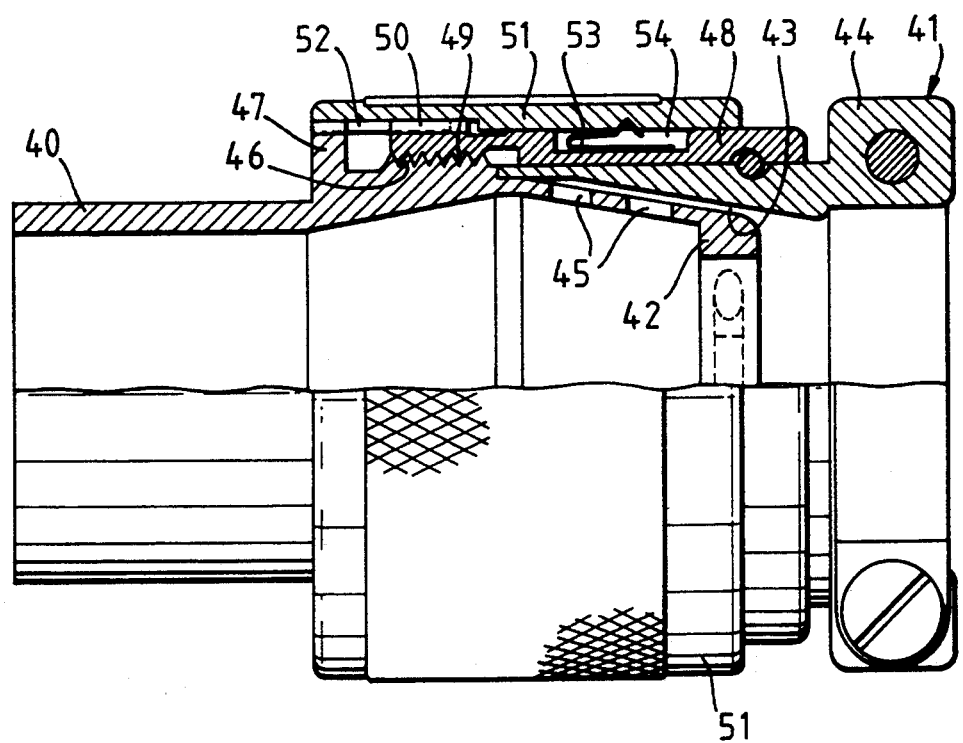

The invention could be used to lock together two components of a single connector such as illustrated in FIGS. 3 and 4. In this arrangement, the invention is used to lock a cone member 40 in a cable fitment 41. The cone member has a perforated cone 42 at its right-hand end which nests within a conical recess 43 within an outer body 44 at the right-hand end of the fitment. Braiding from screened wires (not shown) can be passed through perforations 45 in the cone 42 and be trapped between the cone and the body 44 so as to make ground connection with the screening in the manner described in GB 2256097. The cone member 40 has an external screw thread 46 located to the right of a splined flange 47. A rotatable sleeve 48 is carried by the body 44, the sleeve having an internal screw thread 49 at its left-hand end that is screwed onto the thread 46 on the cone member 40. The sleeve 48 also has an external splined flange 50 at the left-hand end, the splines on the flange being of the same shape as those on the cone member flange 47. A locking ring 51, similar to the locking ring 3 described above, is carried by the sleeve 48 and is slidable along its length from an unlocked position to the right (FIG. 3) to a locked position to the left (FIG. 4). The locking ring 51 has internal splines 52 that engage the splined flange 50 on the sleeve 48 and that also engage the splined flange 47 on the cone member 40, when the ring is pushed into its locking, left-hand position.

In use, the cone member 40, with the braid of the wires protruding from the perforations 45, is pushed into the body 44. The locking ring 51 is gripped and twisted so that it rotates the sleeve 48 on the body 44 and its screw thread 49 draws the cone member 40 further into the body to clamp the braiding firmly in place. When the desired tightness has been achieved, the ring 51 is pushed to the left, so that its splines 52 engage the splined flange 47. Spring catches 53 located in apertures 54 in the sleeve 48 engage an internal groove 55 around the locking ring 51 when it is in its locked position, so that displacement of the ring out of its locking position is resisted. In this position, the locking ring 51 prevents rotation of the sleeve 48 relative to the cone member 40 and thereby prevents separation of the parts of the fitment until the locking ring is pushed back to its unlocked position.

Figure 5:
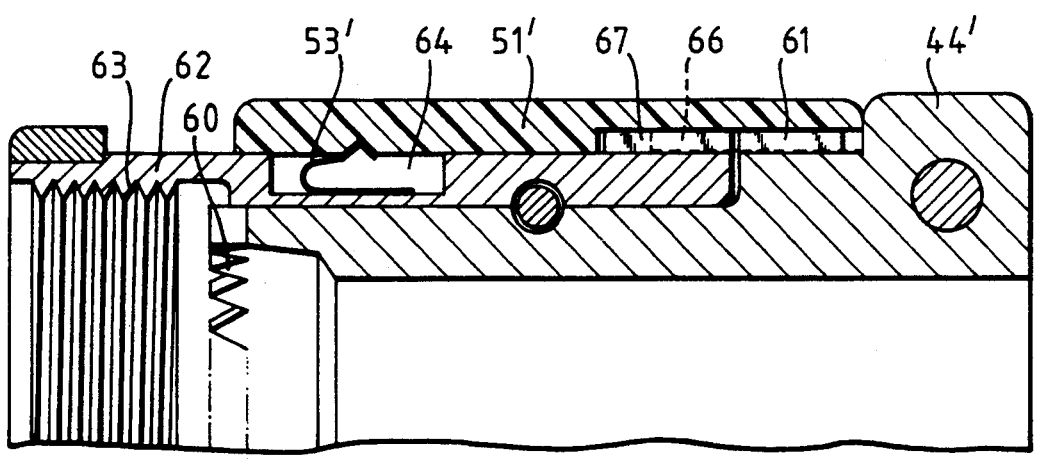
FIGS. 5 and 6 are sectional side elevations of a further alternative assembly in a locked and unlocked position respectively.
Figure 6:
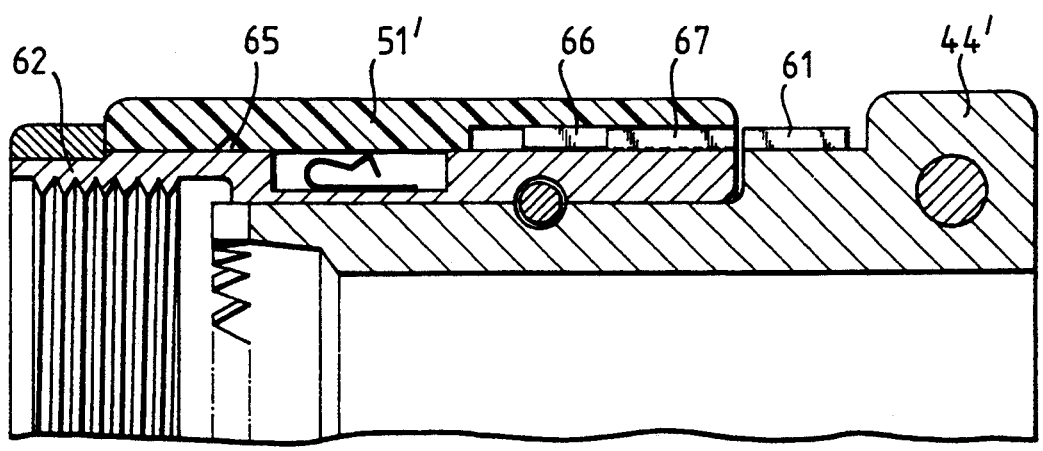

The present invention can also be used to retain an accessory on the back of a connector, as shown in FIGS. 5 and 6. In this arrangement, the accessory takes the form of a cable clamp 44' similar to the body 44 shown in FIGS. 3 and 4. The cable clamp is of generally cylindrical form and is provided at its left-hand end with triangular teeth or castellations 60, which are adapted to mate with cooperating teeth on the main body of the connector. Towards its right-hand end, the cable clamp 44' has an externally-splined region 61 extending circumferentially around the clamp. A coupling nut 62 is carried at the left-hand end of the clamp 44', the nut being freely rotatable about the clamp. At its left-hand end, the coupling nut 62 has an internal screw thread 63 adapted to engage an external thread formed on the main body of the connector. The coupling nut 62 has four recesses 64 (only one of which is shown) about midway along its length in which are located respective spring catches 53'. The spring catches 53' engage in recesses 65 on the inside of a locking ring 51', which is slidable along the coupling nut 62. On the inside of the locking ring 51', at its fight hand end, there is a splined region 66 that engages external splines 67 at the fight-hand end of the coupling nut 62. When in its locked position shown in FIG. 5, the splines 66 on the locking ring 51' engage both the splines 67 on the coupling nut 62 and the splines 61 on the cable clamp 44' so that rotation of the coupling nut relative to the cable clamp is prevented.

In use, the locking ring is initially in the unlocked position shown in FIG. 6 so that the coupling nut 62 can be screwed onto the main body of the connector and the cable clamp 44' is thereby drawn to the left. When the castellations 60 on the cable clamp 44' mate firmly with the castellations on the main body of the connector, the locking ring 51' is slid to the fight to its locked position shown in FIG. 5 and is held in this position by engagement of the spring catches 53' in the recesses 65. In this position, the castellations 60 on the cable clamp 44' and the main body of the connector prevent rotation of the cable clamp relative to the main body, whereas the locking ring 51' prevents rotation of the coupling nut, so that the cable clamp is held in its left-hand position. This arrangement reduces the risk of the coupling clamp 44' on being loosened by vibration.

In the arrangements shown in FIG. 5 to 6, the locking ring is preferably of a plastics material. This reduces the risk of vibration loosening the locking ring because it can be of lighter weight than an equivalent metal locking ring. It is possible, however, for the locking ring to be of a metal.

Figure 7:
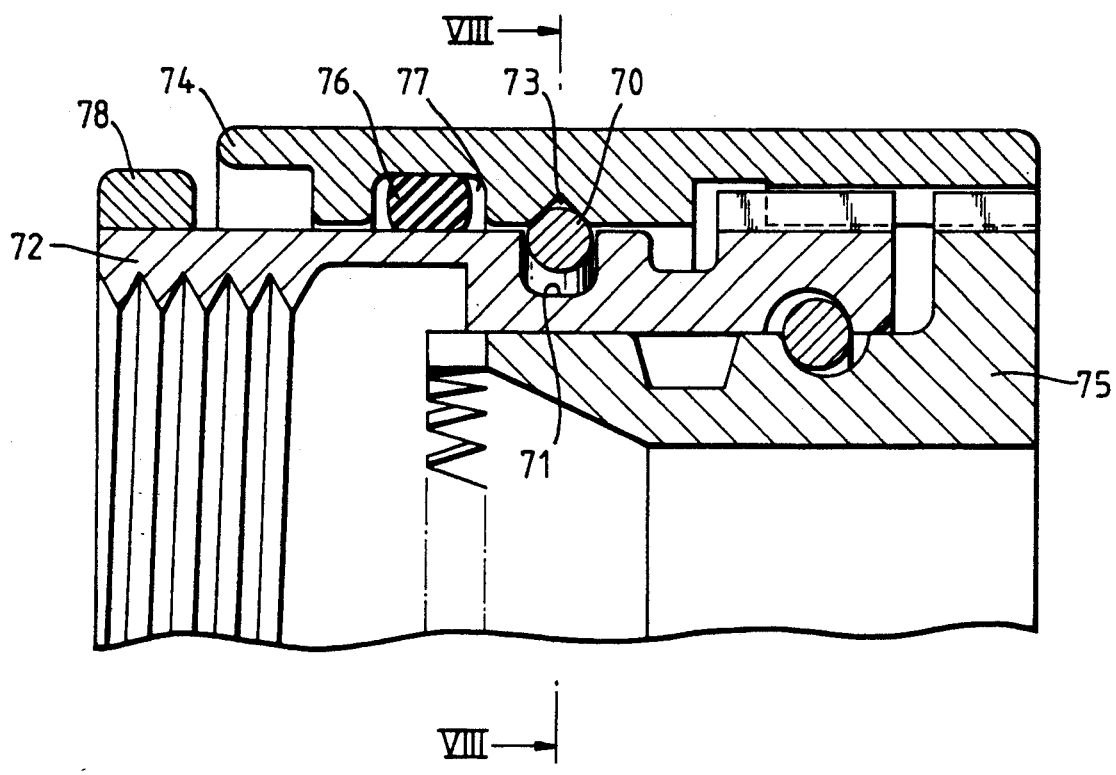
FIG. 7 is a sectional side elevation of a part of a modifed assembly in a locked state.
Figure 8:
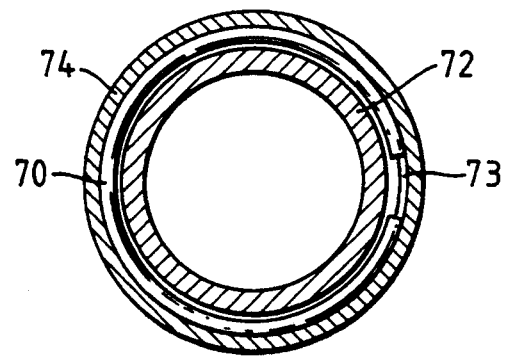
FIG. 8 is a transverse section of the assembly in FIG. 7 along the line VIII—VIII.

FIGS. 7 and 8 show a further modification of the connector assembly in which the spring catches 53 or 53' have been replaced by a single part-circular retaining spring 70. The spring 70 is located in an annular groove 71 around the coupling nut 72 and engages in an annular groove 73 of V-section on the inside of a metal locking ring 74 when the locking ring is in its locked position with respect to the cable clamp 75. The locking ring 74 can be slid to the left, to an unlocked state if an axial force is applied sufficient to overcome the retaining force of the spring so that it is pushed into the groove 71 by the right-hand slope of the V-shape groove 73. The assembly also includes a resilient O-ring 76 of an elastomeric material such as rubber, alternatively, the O-ring could be of other resilient materials such as fluorocarbons. The O-ring 76 is located in an annular channel 77 of rectangular section that extends around the inside of the locking ring 74 to the left of the V-shape groove 73. The thickness of the O-ring 76 is greater than the depth of the channel 77 so that it is deformed out of its natural circular section and is compressed between the locking ring 74 and the coupling nut 72. This acts to damp vibration of the locking ring 74 on the coupling nut 72 and reduces the risk of the locking ring being unlocked by vibration. The nature of the O-ring 76 is not such as to prevent the locking ring 74 being manually displaced between its locked and unlocked states.

In the embodiment of FIG. 7, the locking ring 74 is prevented from being displaced off the assembly to the left by means of a separate, annular metal stop 78 welded or brazed onto the nut 72. Displacement of the ring 74 to the right is limited by engagement with the splines on the nut.

Figure 9:
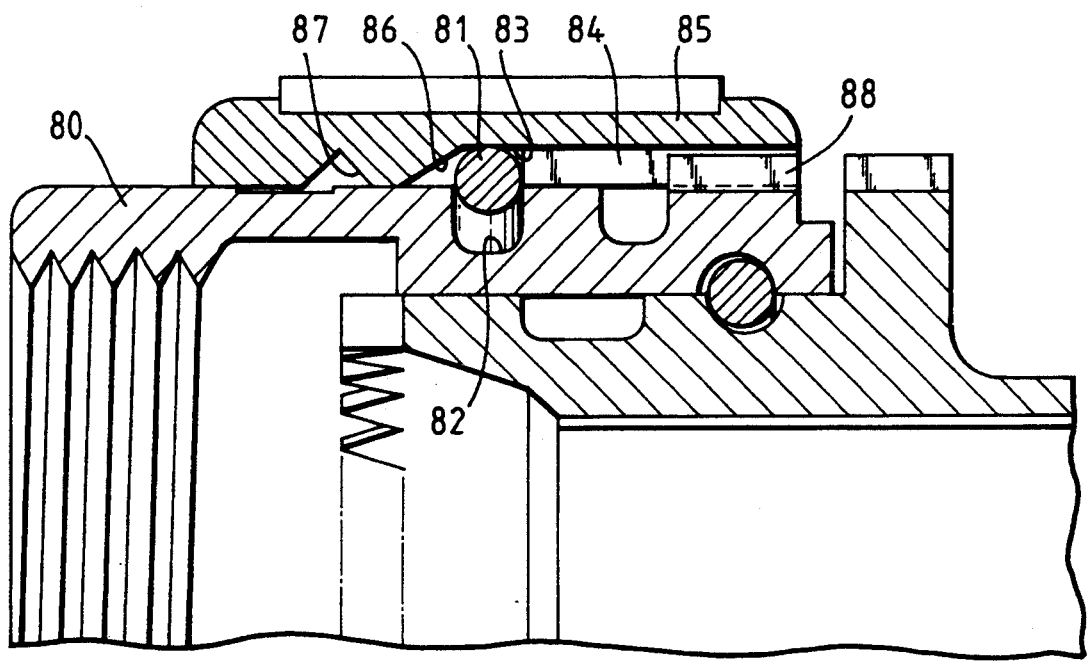
FIGS. 9 and 10 are transverse sections of another alternative assembly in a locked and unlocked position respectively.
Figure 10:
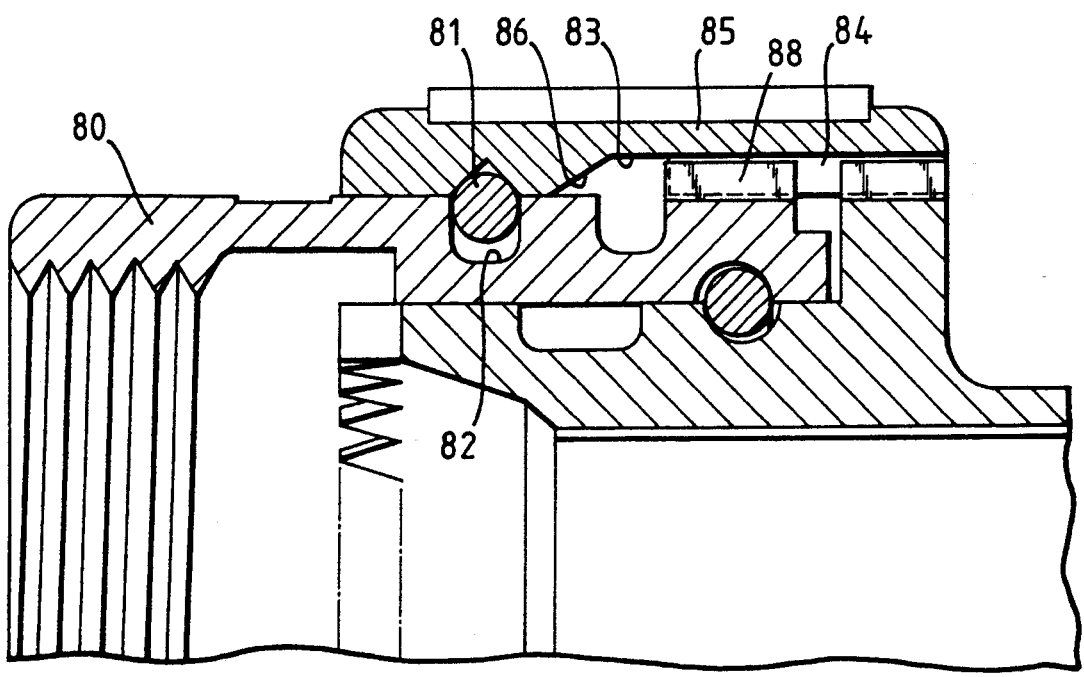

An alternative arrangement avoiding the need for a separate stop is shown in FIGS. 9 and 10. The nut 80 has a circular metal spring 81 in a groove 82. In the unlocked position shown in FIG. 9, the spring 81 is urged outwardly by its resilience into a recess 83 to the left of the splines 84 on the locking ring 85. Movement of the ring 85 further to the left is limited by engagement of the spring 81 with the left-hand edge of the splines. The locking ring 85 can be moved to the right, to the locked position shown in FIG. 10, because the spring is forced inwardly into the groove 82 by an inclined ramp 86 at the left-hand end of the recess 83. When fully displaced to the right, the spring 81 snaps into a triangular recess 87 at the left-hand end of the locking ring 85. This provides a spring retention of the locking ring 85 in its locked position. Displacement of the locking ring 85 off the right-hand end of the nut 80 is prevented by engagement of the ramp 86 on the locking ring with the splines 88 on the nut. This arrangement facilitates assembly of the locking ring 85 on the nut 80 during manufacture since it can be simply pushed onto the nut from the left-hand end of the nut until the spring 81 snaps into the recess 83 to the left of the splines 84.

What I claim is:

1. An electrical connector assembly comprising: first and second components, said first and second components being rotatable relative to one another; a surface formation on an outer surface of each component; a locking ring having a surface formation on an inner surface that is shaped to cooperate with the surface formation on the components, said locking ring being displaceable axially along the assembly between a first position in which the surface formation on the locking ring is out of engagement with at least the surface formation on one of the components so as to allow relative rotation of the two components and a second position in which the locking ring embraces the first and second components and the surface formation on the locking ring engages the surface formations on both the components so as to prevent relative rotation of the components and thereby lock the two components together.

2. An electrical connector assembly according to claim 1, wherein the surface formations are splines.

3. An electrical connector assembly according to claim 1, wherein the assembly includes a resilient member, said resilient member resisting axial displacement of the locking ring along the assembly.

4. An electrical connector assembly according to claim 1, wherein the locking ring is of a plastics material.

5. An electrical connector assembly according to claim 1, wherein the assembly includes an elastomeric member, said elastomeric member contacting the locking ring to absorb vibration of the locking ring.

6. An electrical connector assembly according to claim 1, wherein the first and second components have cooperating threads, said threads being engageable with one another to draw the components together.

7. An electrical connector assembly according to claim 1, wherein the first and second components are electrical plug and socket components.

8. An electrical connector assembly according to claim 1, wherein the first and second components are parts of an electrical connector, and wherein one of the components is a cable fitment.

9. An electrical connector assembly comprising: first and second components, said first and second components being rotatable relative to one another, said components having cooperating screw threads that are engageable with one another to draw the components together; a plurality of longitudinally-extending splines on the outside of each component; a locking ring having a plurality of longitudinally-extending splines on an inner surface that are shaped to cooperate with the splines on the components, said locking ring being slidable axially along the assembly between a first position in which the splines on the locking ring are out of engagement with at least the splines on one of the components so as to allow relative rotation of the two components and a second position in which the splines on the locking ring engage the splines on both the components so as to prevent relative rotation of the components and thereby lock the two components together.

* * * * *